(12) United States Patent
Hörmann

(10) Patent No.: US 7,252,018 B2  
(45) Date of Patent: Aug. 7, 2007

(54) DRIVE FOR CLOSURE ELEMENTS

(75) Inventor: Michael Hörmann, Oerlinghausen (DE)

(73) Assignee: Marantec Antriebs-und Steuerungstechnik GmbH & Co. KG, Marienfeld (DE)

( * ) Notice: Subject to any disclaimer, the term of this patent is extended or adjusted under 35 U.S.C. 154(b) by 650 days.

(21) Appl. No.: 10/280,666

(22) Filed: Oct. 25, 2002

(65) Prior Publication Data

US 2003/0164061 A1 Sep. 4, 2003

(30) Foreign Application Priority Data

Oct. 26, 2001 (DE) ................ 101 52 906

(51) Int. Cl.  
*F16H 1/16* (2006.01)

(52) U.S. Cl. .................. 74/425; 73/650; 250/231.8

(58) Field of Classification Search .......... 74/425; 73/650; 250/231.8, 231.13  
See application file for complete search history.

(56) References Cited

U.S. PATENT DOCUMENTS

| | | | | |
|---|---|---|---|---|
| 5,086,641 A | * | 2/1992 | Roselli | ............... 73/1.79 |
| 5,253,531 A | * | 10/1993 | Walker et al. | ............... 73/650 |
| 5,852,413 A | * | 12/1998 | Bacchi et al. | ............... 341/13 |
| 6,184,518 B1 | * | 2/2001 | Klein | ............... 250/233 |
| 6,946,649 B2 | * | 9/2005 | Uenaka et al. | ......... 250/231.13 |
| 6,981,423 B1 | * | 1/2006 | Discenzo | ............... 73/800 |
| 2004/0050178 A1 | * | 3/2004 | Parkinson | ............. 73/862.328 |
| 2005/0087683 A1 | * | 4/2005 | Kawai et al. | ......... 250/231.13 |

FOREIGN PATENT DOCUMENTS

| | | |
|---|---|---|
| DE | 3801245 | 8/1988 |
| DE | 19638501 | 4/1998 |
| WO | 98/23921 | 6/1998 |

\* cited by examiner

*Primary Examiner*—David M. Fenstermacher  
(74) *Attorney, Agent, or Firm*—Dilworth & Barrese LLP.

(57) ABSTRACT

A drive for closure elements is provided, in particular in the area of garage and industrial doors, but also for example in the form of roller shutters, with a reference value generator arranged in the motor or in the gearing of the drive for determining the actual position of the closure element. When a reference point position is reached, the reference value generator emits a signal or causes a signal modification, on the basis of which the actual-value generator can be calibrated. The reference value generator has two reference discs rotating in different speeds, which, in predetermined angular positions to one another, define the reference point positions which can be scanned by at least one scanning device.

24 Claims, 17 Drawing Sheets

DRIVE FOR CLOSURE ELEMENTS

BACKGROUND OF THE INVENTION

The invention relates to a drive for closure elements, in particular garage and industrial doors, and for example also for roller shutters, with a reference value generator arranged in the motor or in the gearing of the drive for determining the actual position of the closure element.

Such a drive is already known from DE 38 01 245 C in the form of a door drive. The door drive disclosed there comprises a generator disc, which is connected so as to be co-rotating with a part of the drive motor arranged rotating and to which a scanning device is assigned, by means of which the rotary motion of the generator disc is converted into a corresponding number of pulses. The number of pulses is detected by a counting device, the counter status of which corresponds to a prescribed position of the door. The arrangement also comprises a reference point indicator device, which for example consists of at least a switch fixed to the door frame and an actuator fixed to the door leaf, by means of which the switch is actuated when the door passes by the corresponding position of the frame. When the switch is actuated, a synchronising signal is generated which forces the counter device to set a certain value, for example the input value of zero. The door is stopped when a comparison adjustment detects agreement between the counter value and a setpoint value corresponding to the desired position of the door. As an alternative to a switch fixed to the door frame as a reference point indicator device, the motion of the door can also be reproduced onto a reference point indicator device by means of step-down gearing. The reproduction of the door motion by means of step-down gearing, however, can lead to a comparatively less exact resolution of the motion sequence.

SUMMARY OF THE INVENTION

The problem of the invention is to develop a generic drive for closure elements in such a way that a very precise indication of the present door position is enabled by means of simple means.

According to the invention, this problem is solved by a generic drive for closure elements with the combination of features herein. Accordingly, the drive has a reference value generator arranged in or on the motor or in or on the gearing for the purpose of determining the actual position of the closure element, whereby the reference value generator has two reference discs rotating at different speeds, which, in predetermined angular positions to one another, define reference point positions which can be scanned by means of at least one scanning device. These reference point positions correspond uniquely to certain door positions. Since certain angular positions of the reference discs rotating at different speeds to one another correspond to certain door positions, the door motion can be reproduced into a previously determinable number of rotations of the reference discs depending on the selection of the geometrical assignment of the reference disc size or the application of reference points on the reference discs. A high precision resolution is thus enabled.

Special developments of the invention emerge from the description herein. Accordingly, the reference discs can be connected together by means of a gearing. The reference discs can have different diameters, whereby the reference disc center points are arranged offset with respect to one another.

According to a preferred variant of embodiment, the larger reference disc can be connected to an internal geared wheel, whereby the smaller reference disc can be connected to a gear wheel engaging with this internal geared wheel in such a way that both reference discs largely overlap at least in one area during the rotation. According to this preferred development of the invention, at least one scanning device can be arranged in this overlapping area.

Signal marks in defined patterns are advantageously made on the reference discs. The signal marks preferably consist of holes and the corresponding scanning devices consist of light barriers which generate signals when the light passes through two overlapping holes during the rotation of the reference discs.

The signal marks can consist of patterns of holes arranged parallel to one another in the radial or also in the axial direction and arranged distributed on the periphery of the reference discs, whilst on the large reference disc parallel holes are arranged only in one place, said holes, in combination with the patterns of holes of the smaller reference disc, generating different signals in the light barriers of the scanning device depending on the angular position. The hole pattern of the large reference disc thus serves as a mask which is opened only after each complete rotation, whereby different patterns of holes, i.e. different codings, of the smaller reference disc become visible here. These codings are assigned to specified positions of the closure element. In principle, the previously described patterns of holes can also be arranged on the respective other reference disc.

Another preferred development of the invention consists in the fact that both reference discs are widened over a part—preferably half—of their periphery and that the small reference disc has signal marks arranged distributed on the periphery, whilst the large reference disc has one signal mark.

With this variant of embodiment, too, the signal marks can preferably be holes and the scanning device can consist of two light barriers. The inner light barrier can be the one which detects a complete revolution of the larger reference disc. The outer light barrier detects different superimpositions of the widened portions running over half the periphery of the disc, i.e. of the, for example, semicircular rims. A typical bit pattern is thus generated for each revolution. In place of the semicircular rims, several segments can in principle also be provided as corresponding widened portions.

To very particular advantage, the reference value generator can be driven via a worm gear. At least one sensor can be arranged on the worm shaft, said sensor generating, via a generator disc, a timing signal corresponding to the rotational speed of the worm shaft. The outer light barrier of the scanning device can preferably be operated in timing mode via this timing signal. By means of this timing-mode operation, the wear on the worm wheel can be detected, so that with increasing wear the signal generated on the worm shaft leads ever later to a pulse, for example a "light pulse" at the reference discs. This effect can at the same time be used in an advantageous way to monitor the wear on the worm wheel. Excessive wear on the worm wheel can be displayed, which can be used for shutting down or for generating a warning signal. This development of the invention thus simultaneously provides a safety device for displaying the state of the gearing. In this case, it is possible to dispense with the provision of an additional safety catch for the closure element, such as is known from the prior art as an additional safety device, since the case of complete wear of the worm wheel and the associated failure of the support function of the gearing can reliably be avoided. If the signal marks, i.e. preferably holes, are selected as elongated signal marks, i.e. elongated holes for example with a certain opening length, it is possible to take account of a predetermined wear on the worm wheel without an error message being sent out.

The term closure element is to be understood in a comprehensive sense in the context of the invention and concerns, as garage and industrial doors, not only sectional doors, full-area doors and rolling shutter doors, but also for example rotating doors, sliding doors, etc., and in particular roller shutters.

BRIEF DESCRIPTION OF THE DRAWINGS

Further details and advantages of the invention will be explained in greater detail with the aid of two examples of embodiment represented in the following drawing. The figures show.

DESCRIPTION OF THE PREFERRED EMBODIMENTS

Figure 1:
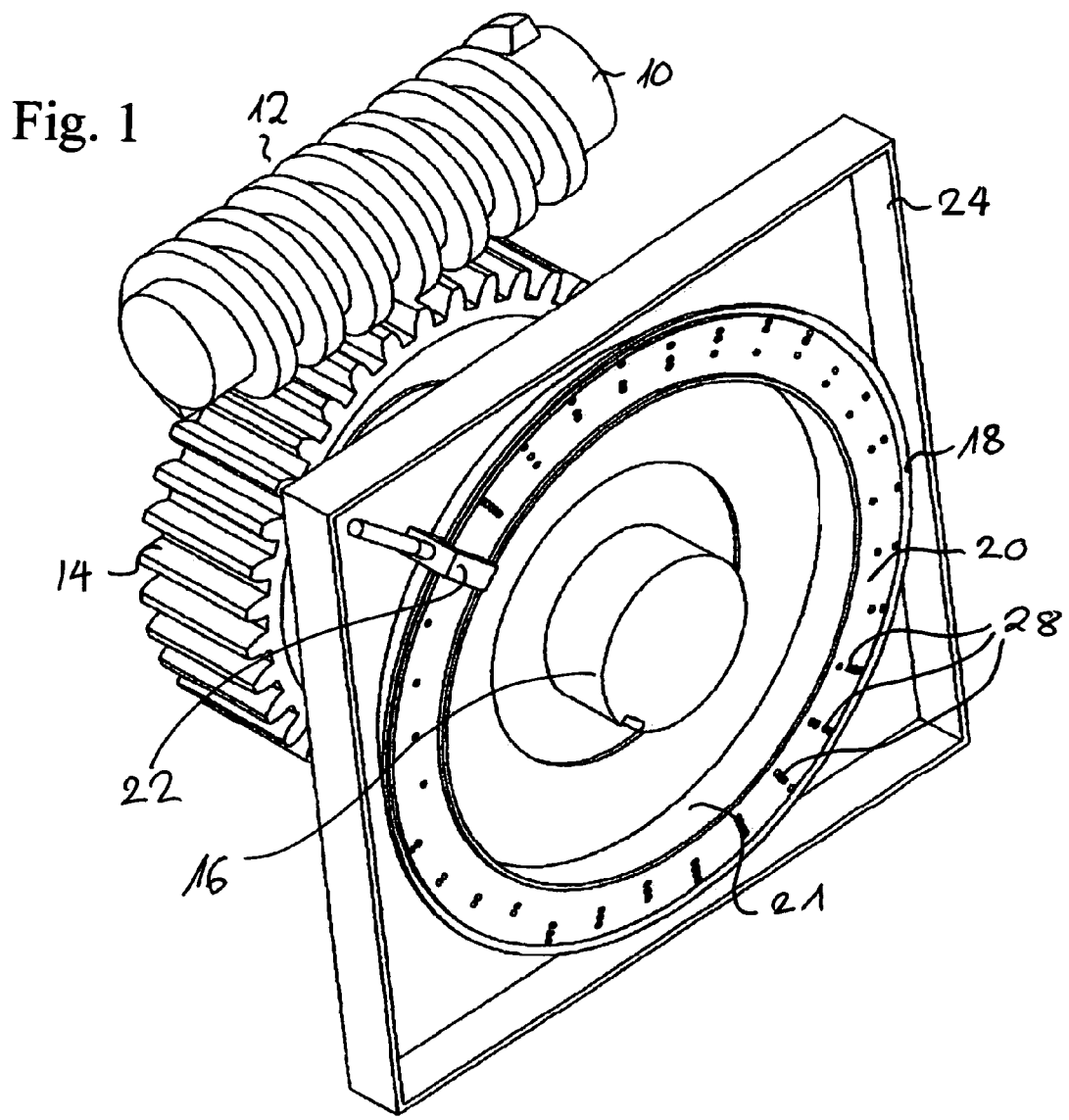
FIG. 1 illustrates a perspective view of a part of a door drive according to a first embodiment of the invention.
Figure 2:
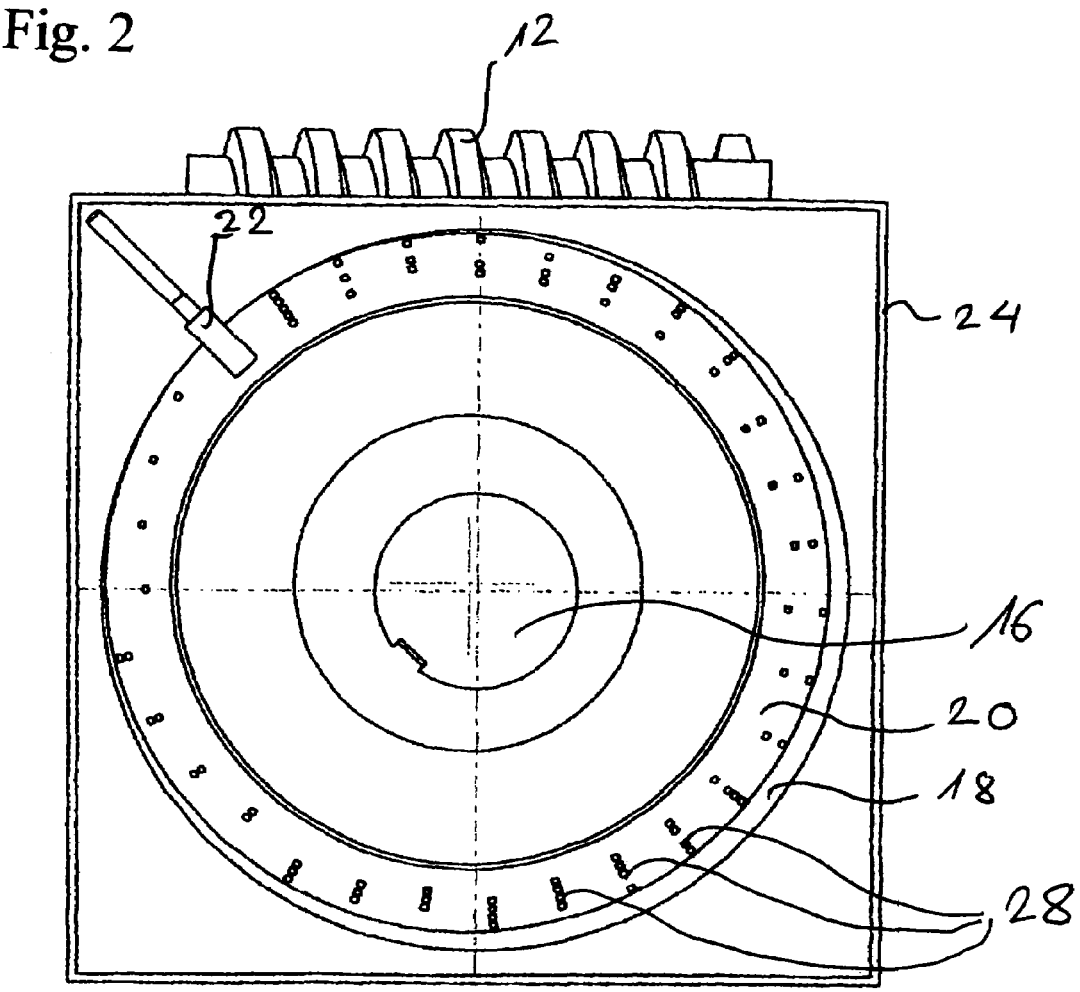
FIG. 2 illustrates a front elevational view of the door drive shown in FIG. 1.
Figure 3:
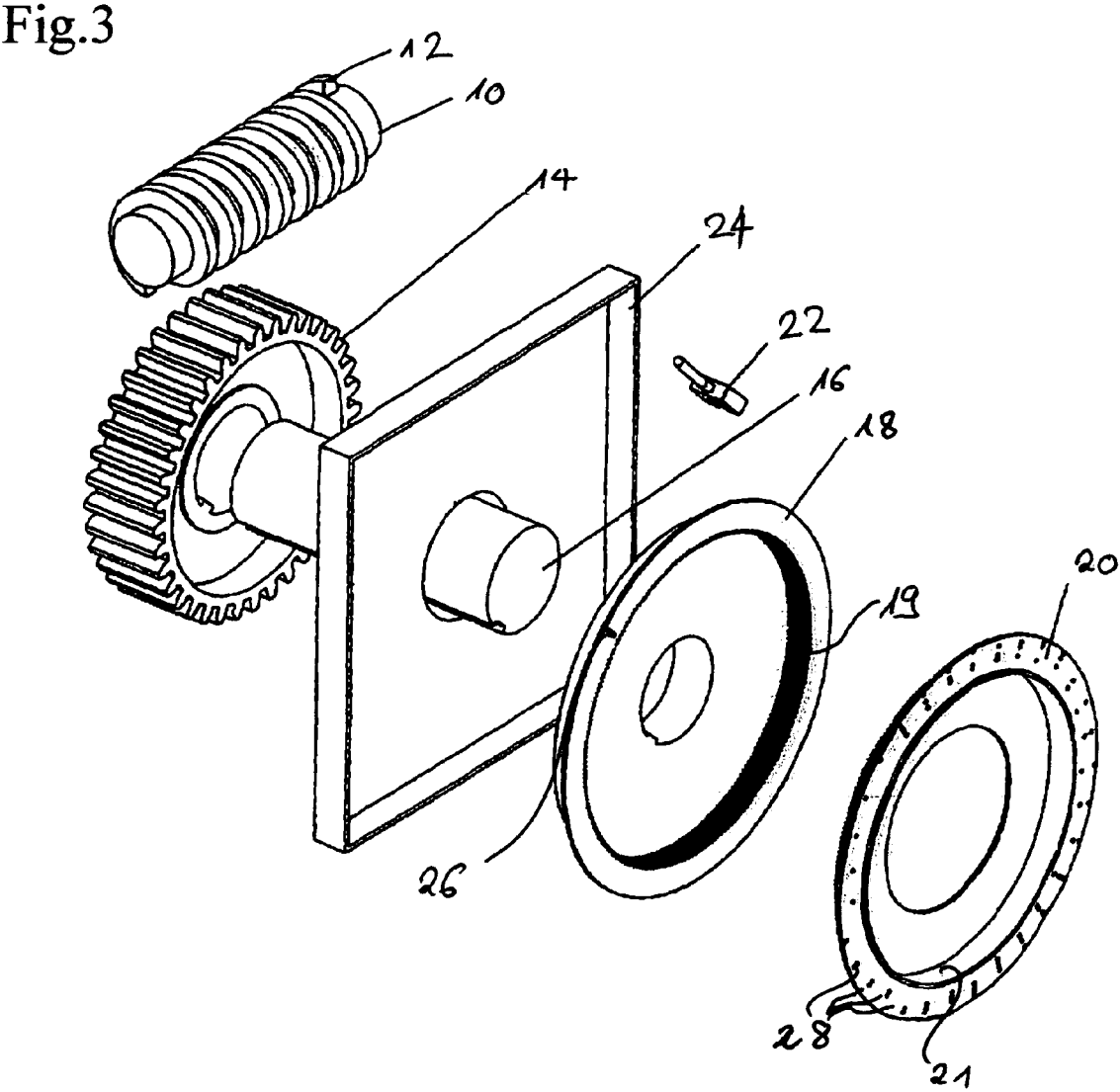
FIG. 3 illustrates an exploded view of the door drive shown in FIG. 1.
Figure 4:
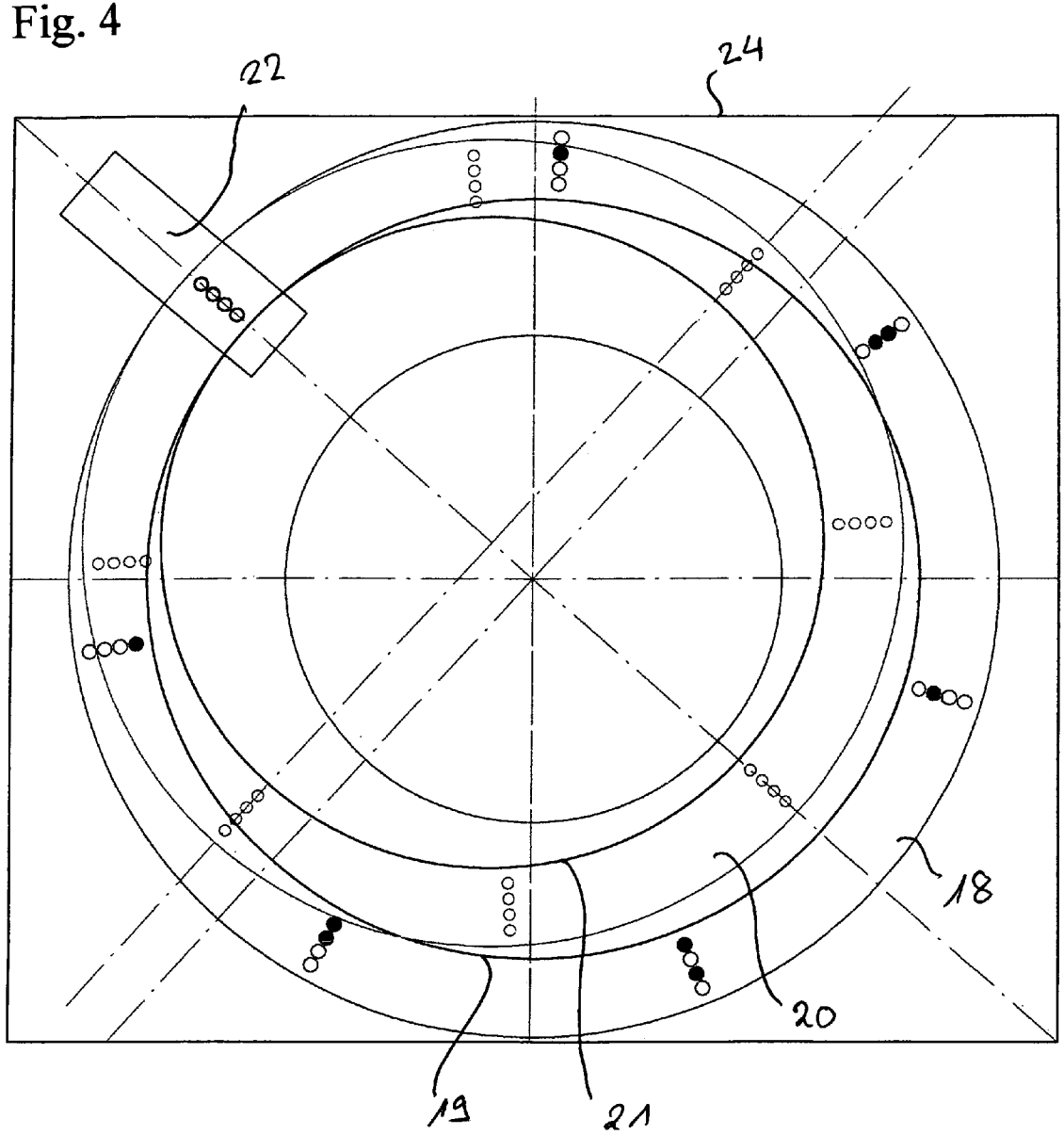
FIG. 4 illustrates a first angular position of the reference discs of the door drive according to FIGS. 1 to 3.
Figure 5:
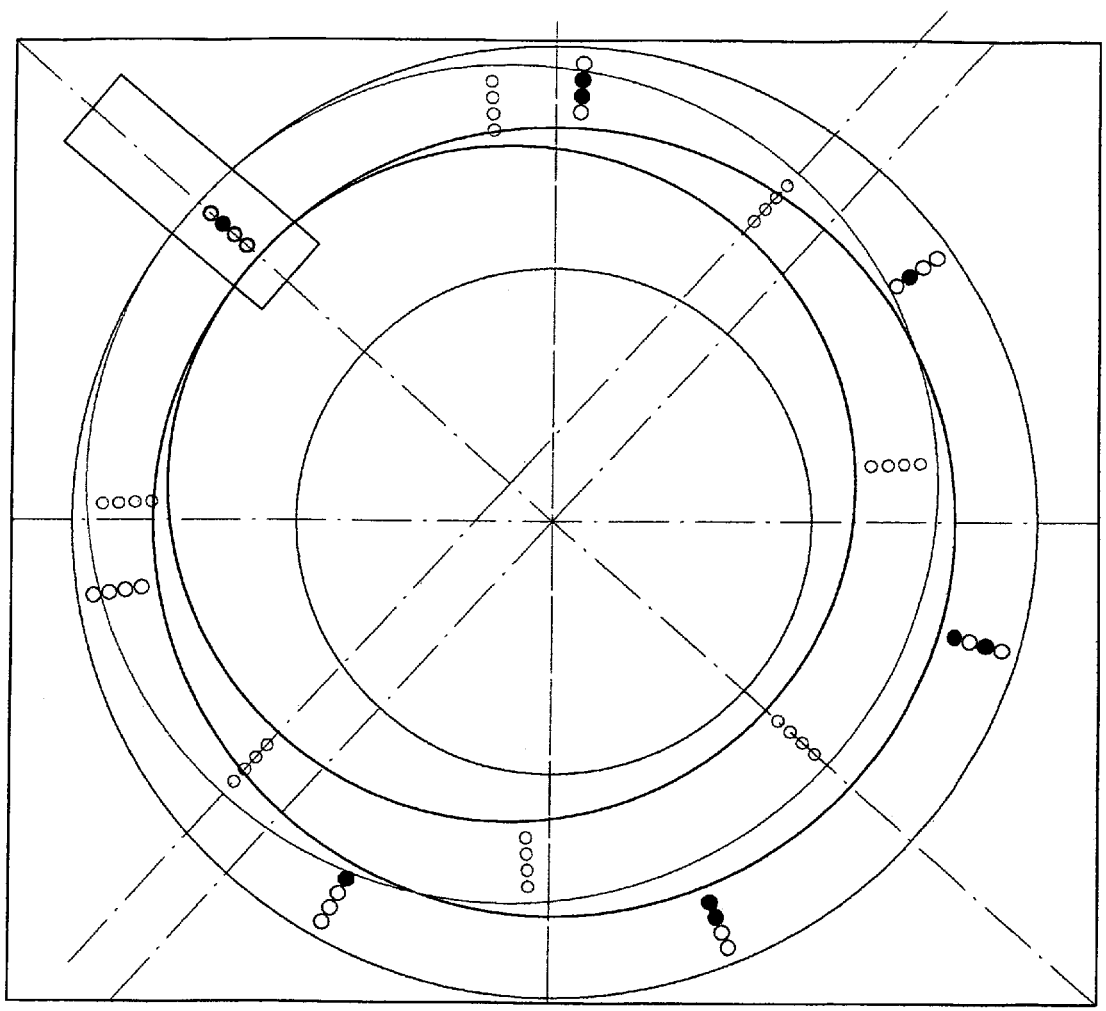
FIG. 5 illustrates a second annular position.
Figure 6:
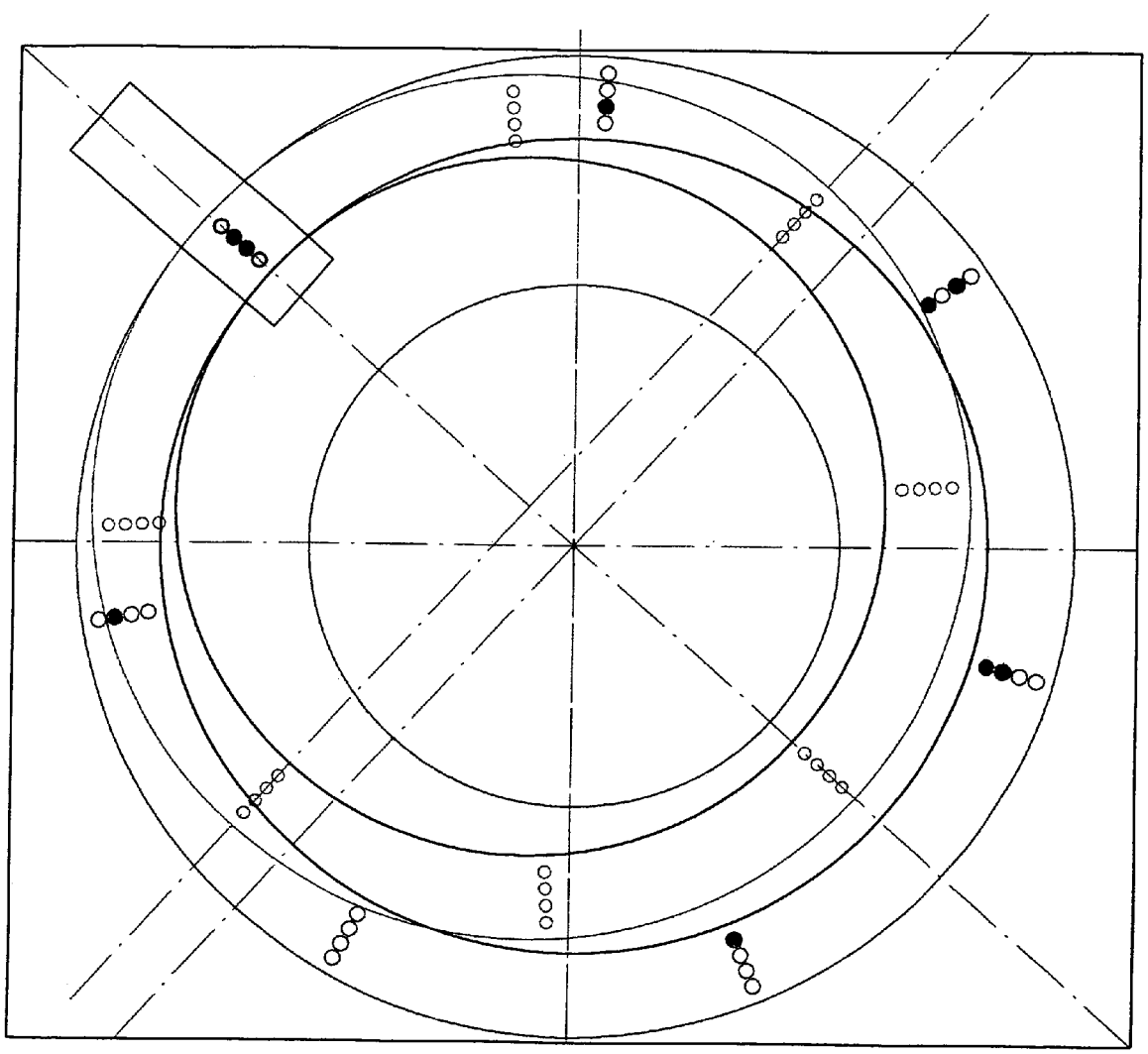
FIG. 6 illustrates a third angular position.
Figure 7:
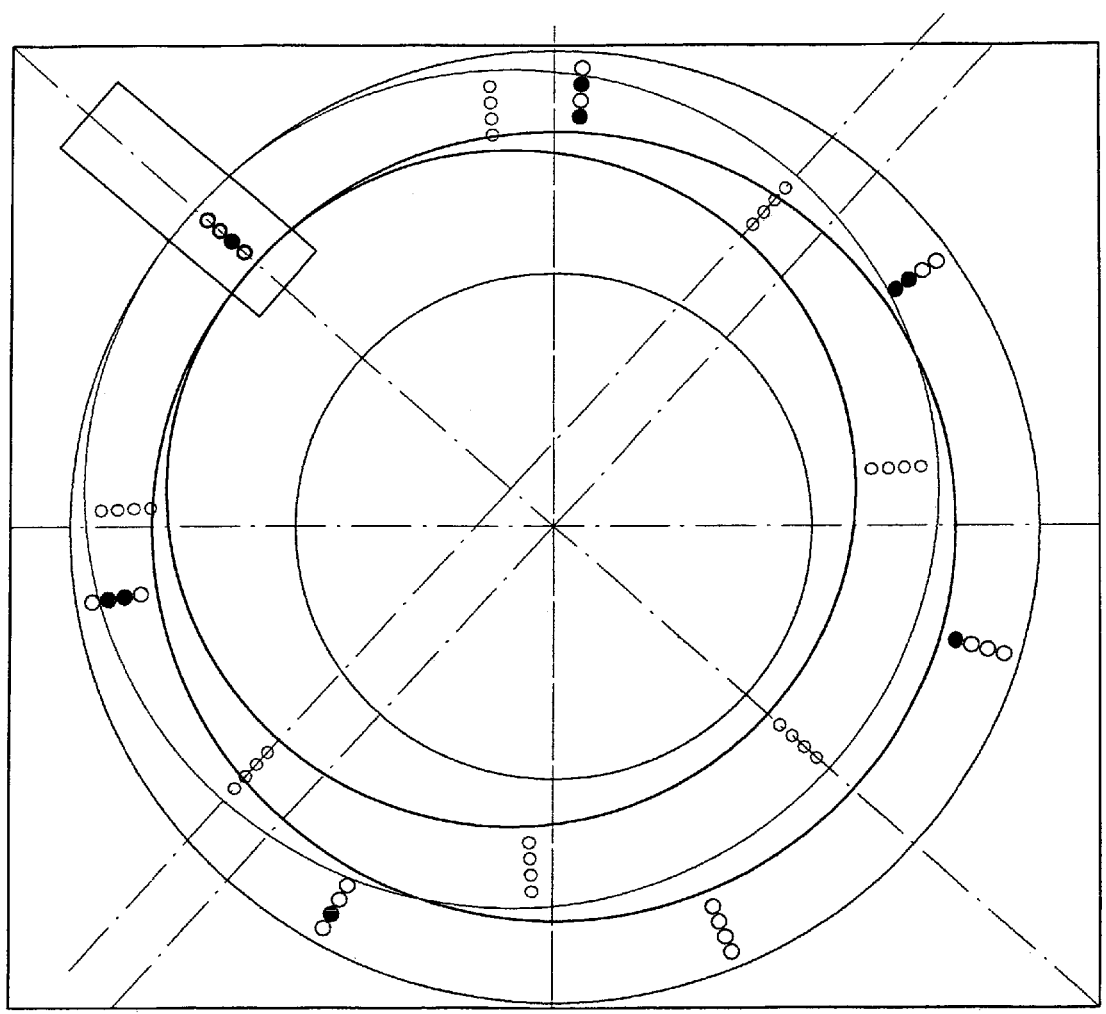
FIG. 7 illustrates a fourth angular position.
Figure 8:
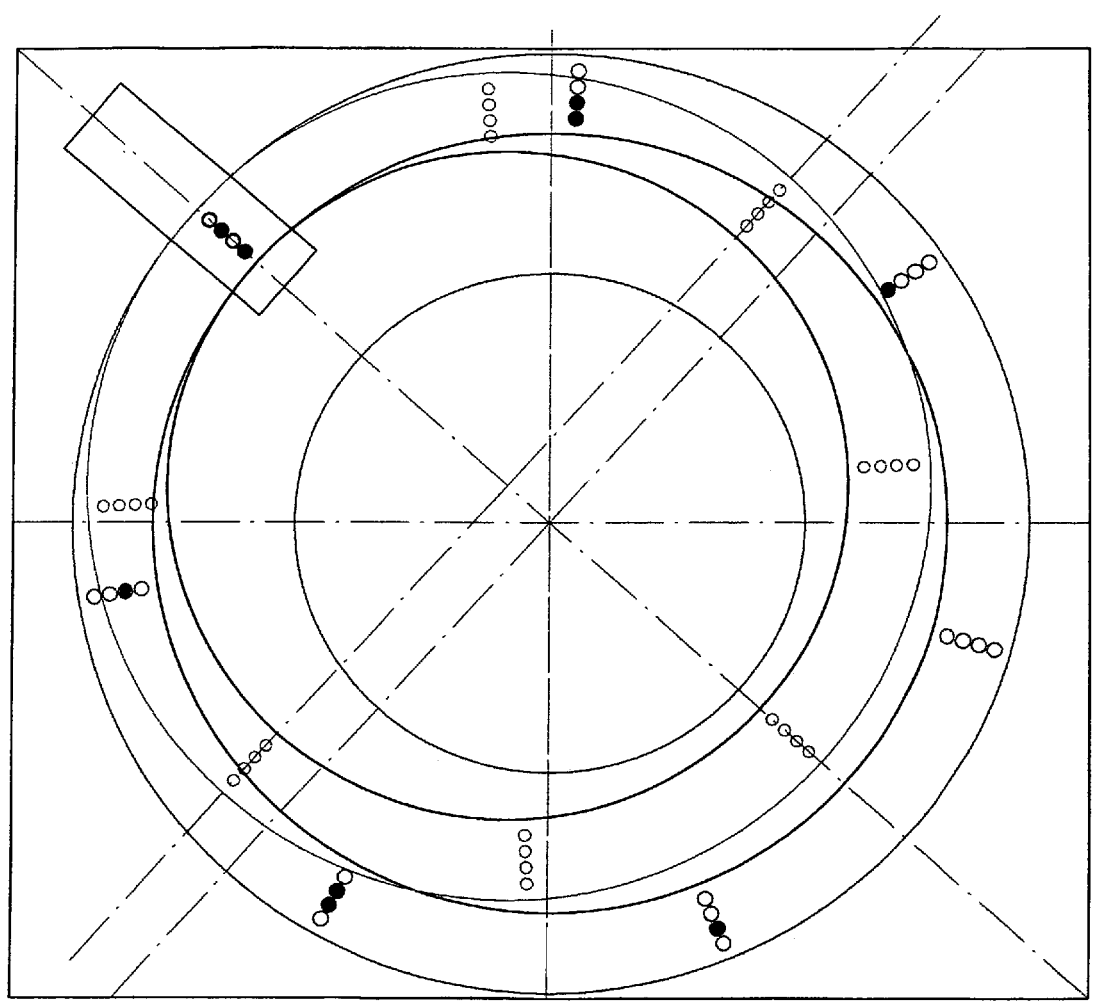
FIG. 8 illustrates a fifth angular position.
Figure 9:
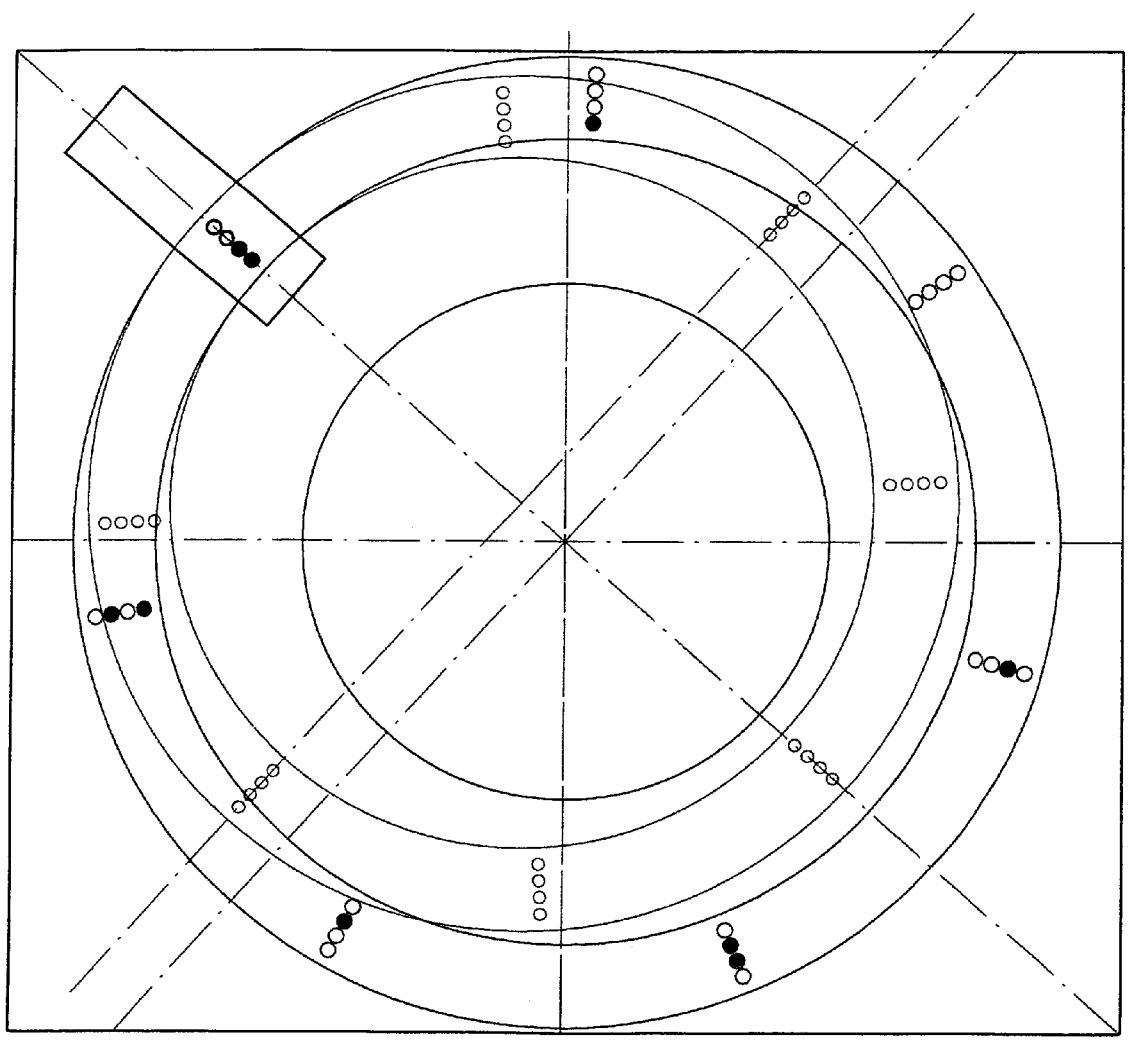
FIG. 9 illustrates a sixth angular position.
Figure 10:
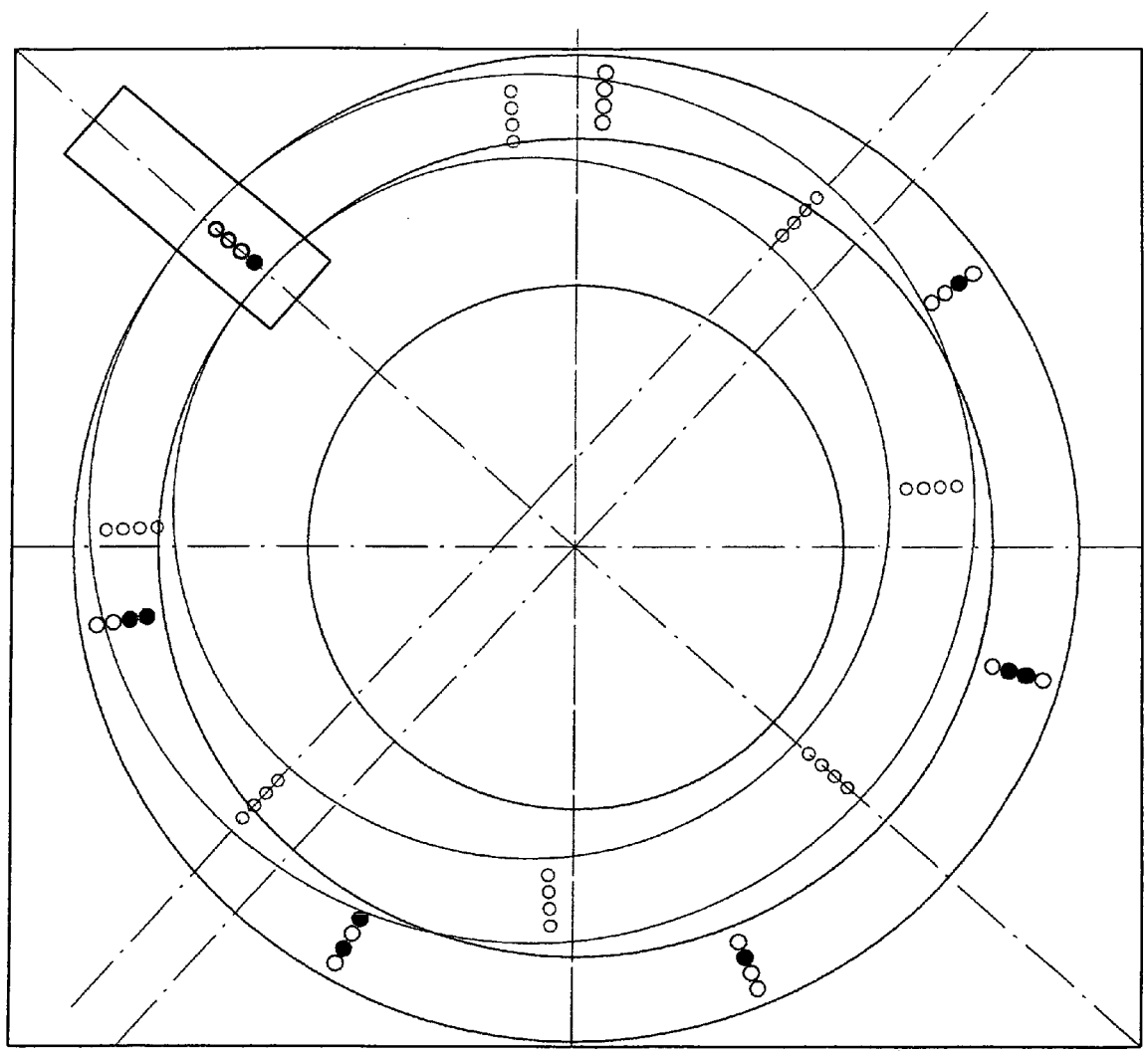
FIG. 10 illustrates a seventh angular position.

FIGS. 1 to 3 show the diagrammatic structure of a part of a door drive according to a first form of embodiment of the invention. A worm 12, which engages with a gear wheel 14, is driven via a worm shaft 10 by the drive motor not shown in detail here. Connected with the gear wheel is a shaft 16, on which a first reference disc 18 sits in a torsion-resistant manner. The precise structure of the reference disc according to the variant of embodiment shown here can be seen most simply in the representation according to FIG. 3, opened up in an exploded view. Reference disc 18 is at the same time designed here as an internal geared wheel with a gear ring 19. A rim borders on this internal gear ring 19 in a flank-like manner. In the example of embodiment represented here, four holes 26 lying in a row are arranged in this rim. A second reference disc 20, which has a slightly smaller diameter, is assigned to this reference disc 18. The former reference disc also has a shoulder 21 which is toothed on the outside, so that a gear wheel is formed which rotates in the internal geared wheel 19. For the sake of simplicity, this toothed shoulder 21 will be designated as gear wheel 21. On gear wheel 21 there is also formed, as part of reference disc 20, a flange-like shoulder in which different hole patterns 28 are arranged equally distributed on the periphery. At the point where the respective rotating flange-like shoulders of reference discs 18 and 20 are largely overlapping, a scanning device 22 is arranged which has four light barriers lying parallel beside one another, which in the example of embodiment represented here are not shown in any detail, said light barriers corresponding to holes 26 and hole patterns 28. Thus, when corresponding holes lie above one another in the area of scanning device 22, a corresponding signal is generated. On the basis of the holes lying next to one another, therefore, a bit pattern is generated which can be assigned to a certain position of the driven closure element, i.e. a garage door for example. The two reference discs 18 and 20 are arranged together with scanning device 22 in a housing 24.

By way of example, the assignment of the respective holes to one another is represented with the aid of an example in FIGS. 4 to 10. The individual figures are distinguished by the fact that here different angular positions of discs 18 and 20 with respect to one another are shown. In the example shown here, four light barriers arranged parallel to one another are provided in scanning device 22, as described above. The outer light barrier is used to detect a complete rotation. The remaining three light barriers are used to scan the N=7 different codings of outer reference disc 20. In the example shown here, the number of revolutions N=7 is selected, the counter number difference D amounts to 13, gear wheel (internal geared wheel) 19 belonging to reference disc 18 has 91 teeth, whilst gear wheel 21 belonging to reference disc 20 has 78 teeth. Pitch circle diameter $D_1$ amounts to 54.6 with a modulus m=0.6, whilst pitch circle diameter $D_2$=46.8. Through the transmission ratio, the small wheel rotates eight times (corresponds to N+1). Hole pattern 26 of larger reference disc 18 is used here as a mask for the hole pattern of smaller reference disc 20.

Figure 11:
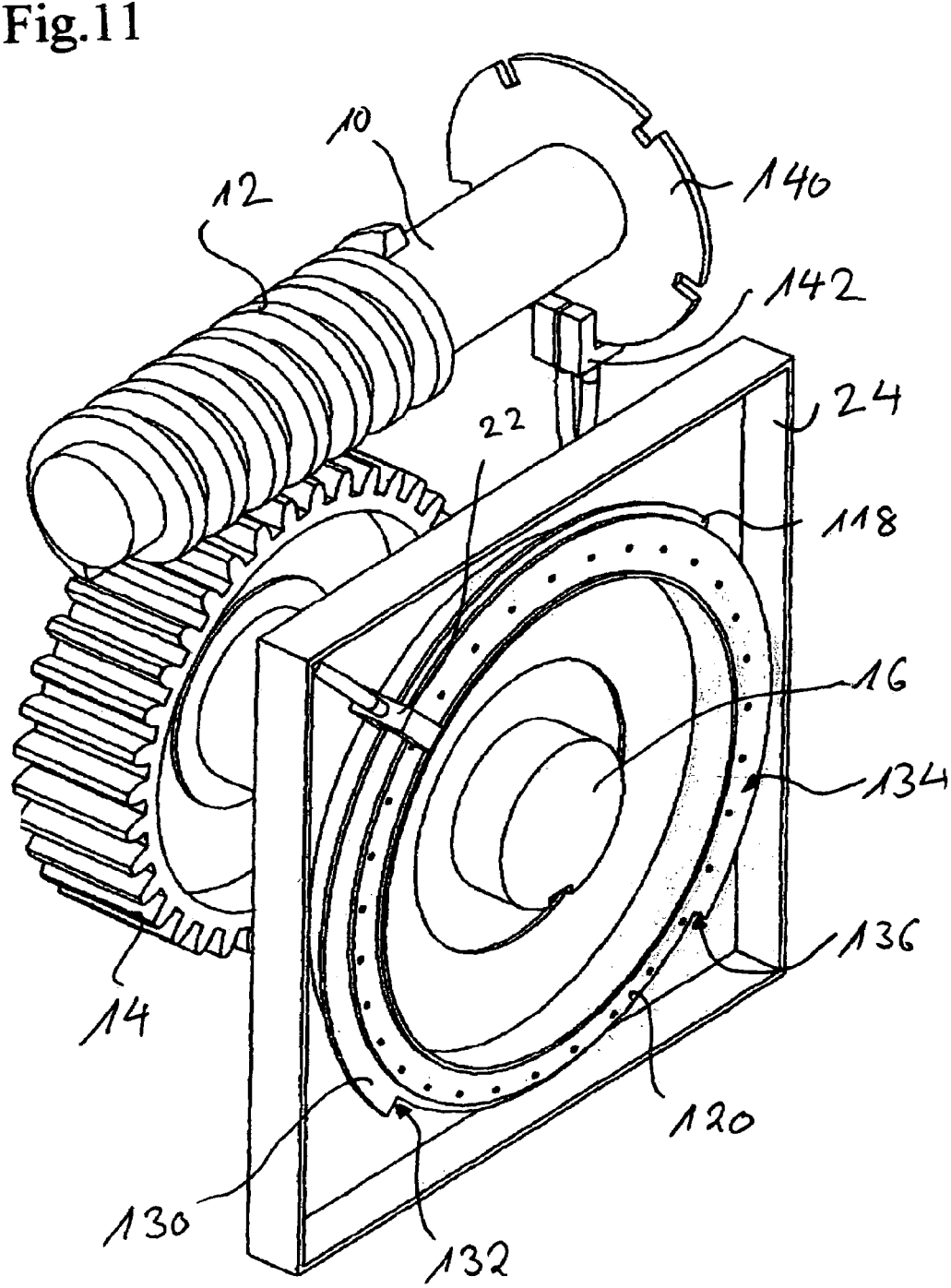
FIG. 11 illustrates a perspective view of an alternative variant of embodiment of a door drive according to the invention in simplified form.
Figure 12:
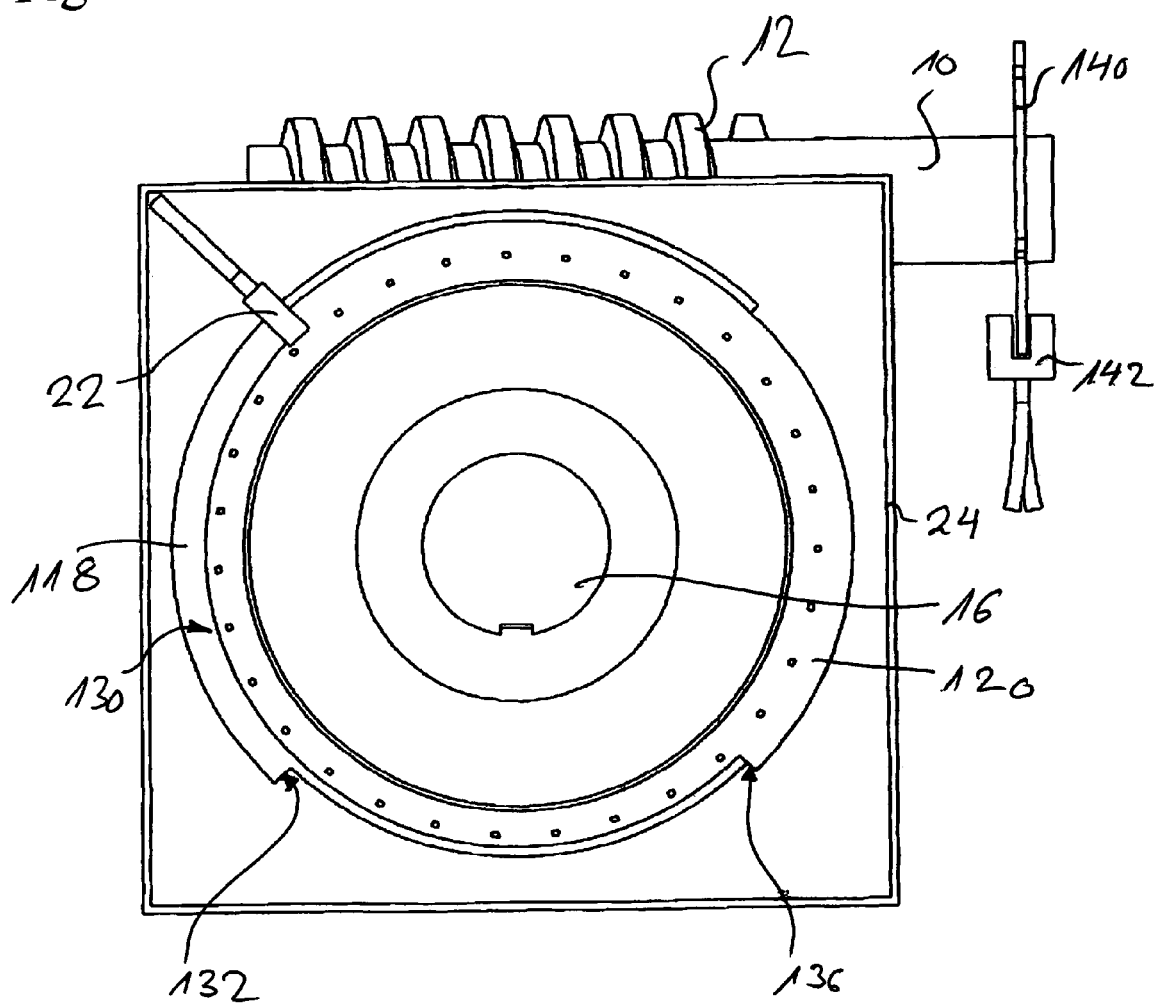
FIG. 12 illustrates a front view elevational view of the door drive of FIG. 11.
Figure 13:
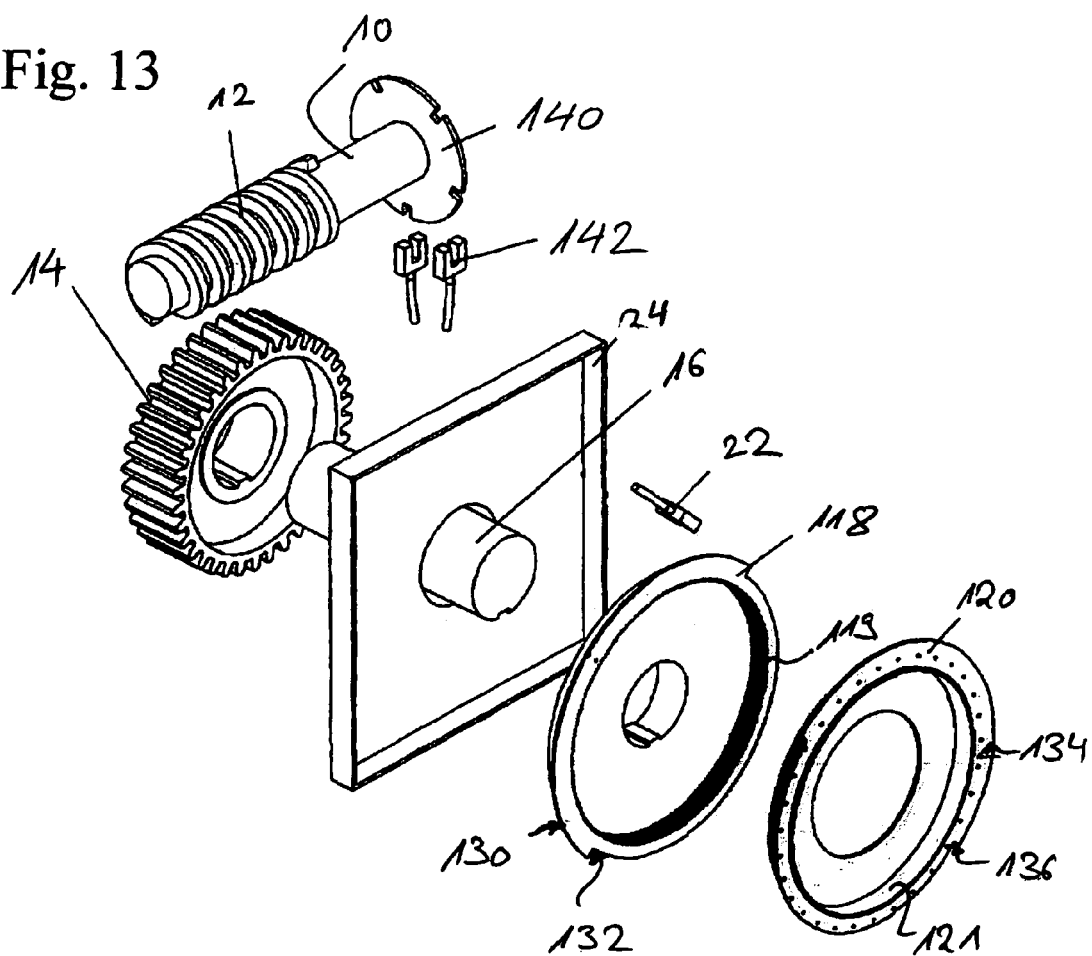
FIG. 13 illustrates an exploded view of the door drive shown in FIG. 11.
Figure 14:
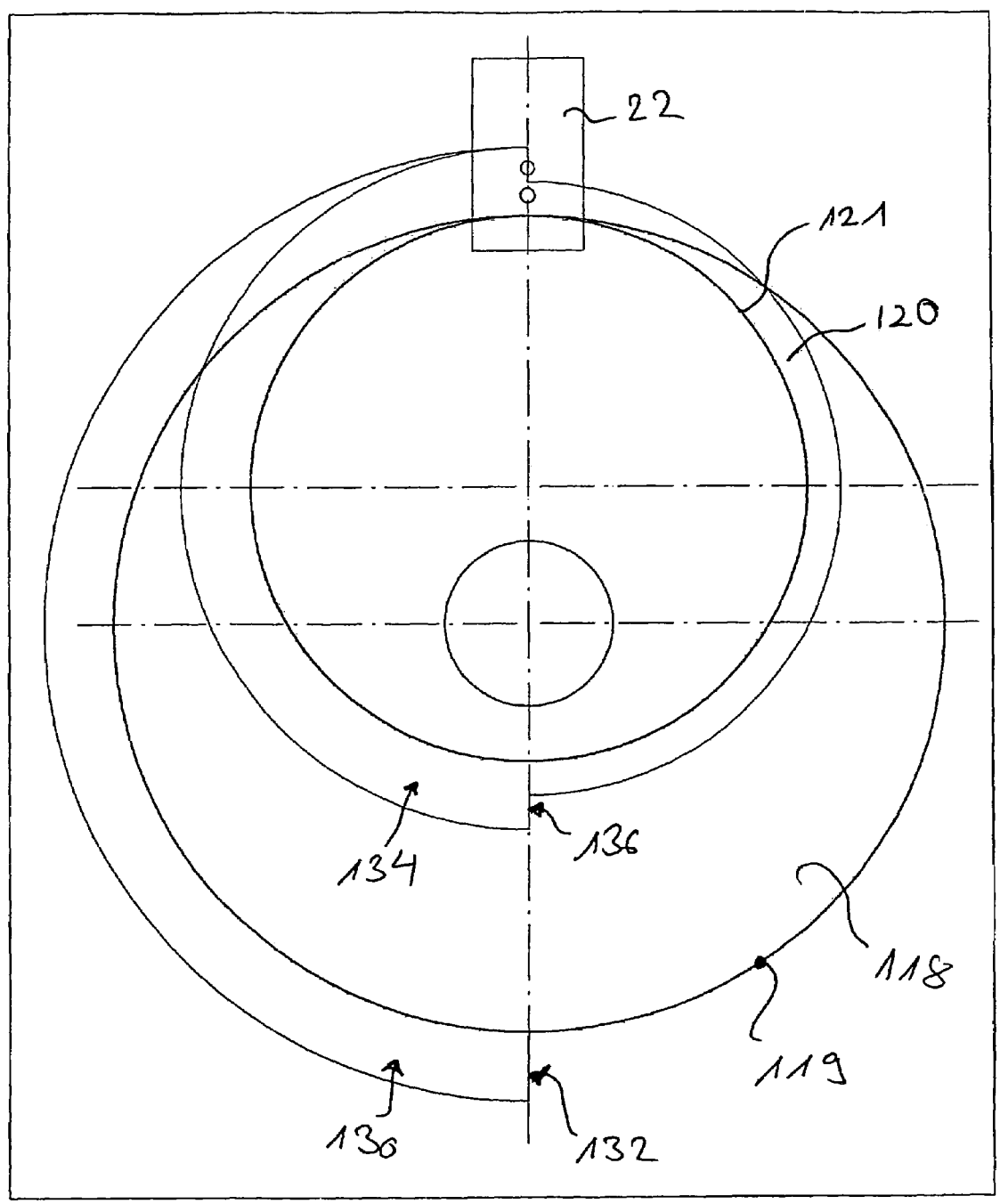
FIG. 14 illustrates a first angular position of reference discs of the door drive according to FIGS. 11 to 13.
Figure 15:
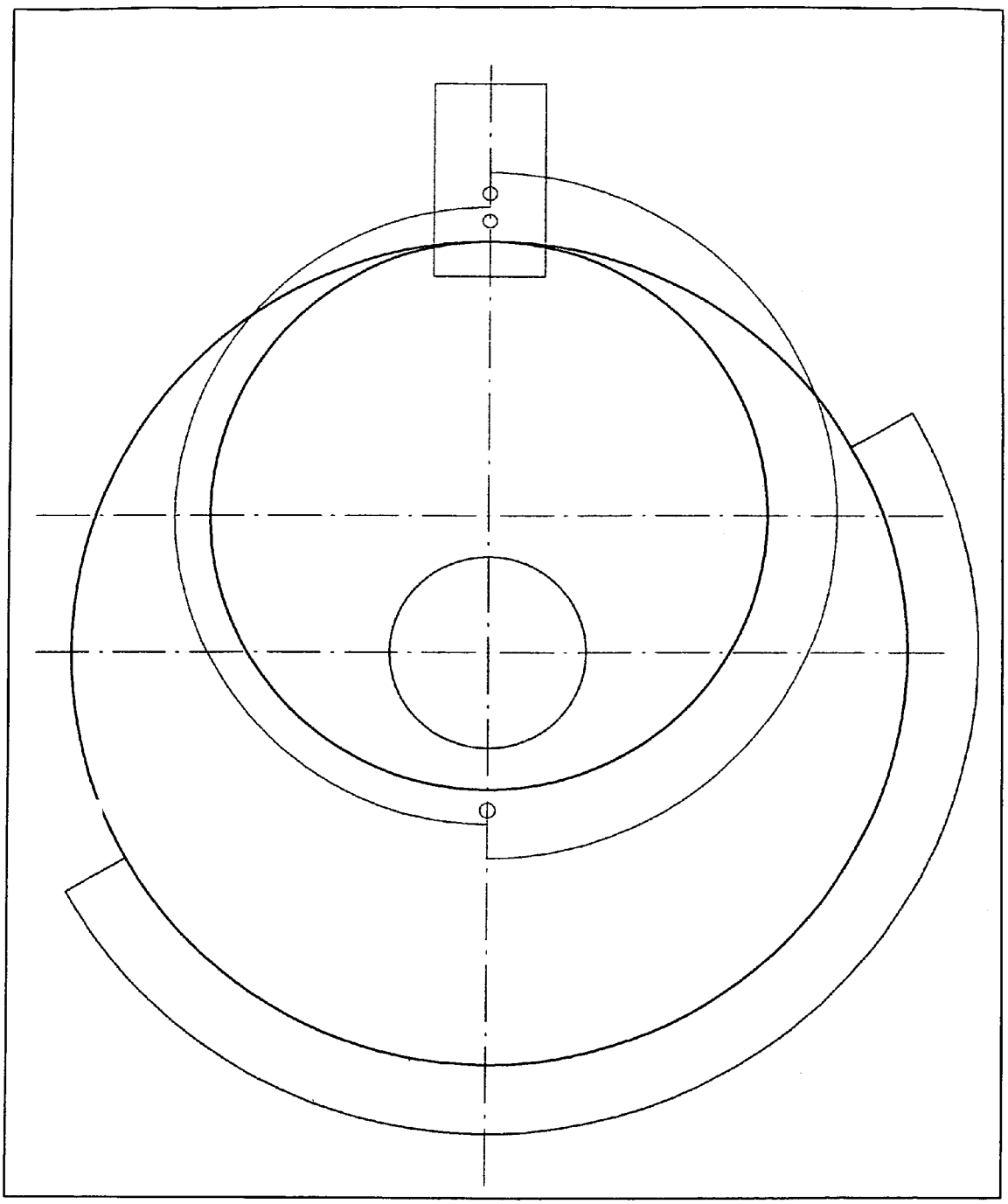
FIG. 15 illustrates a second angular position.
Figure 16:
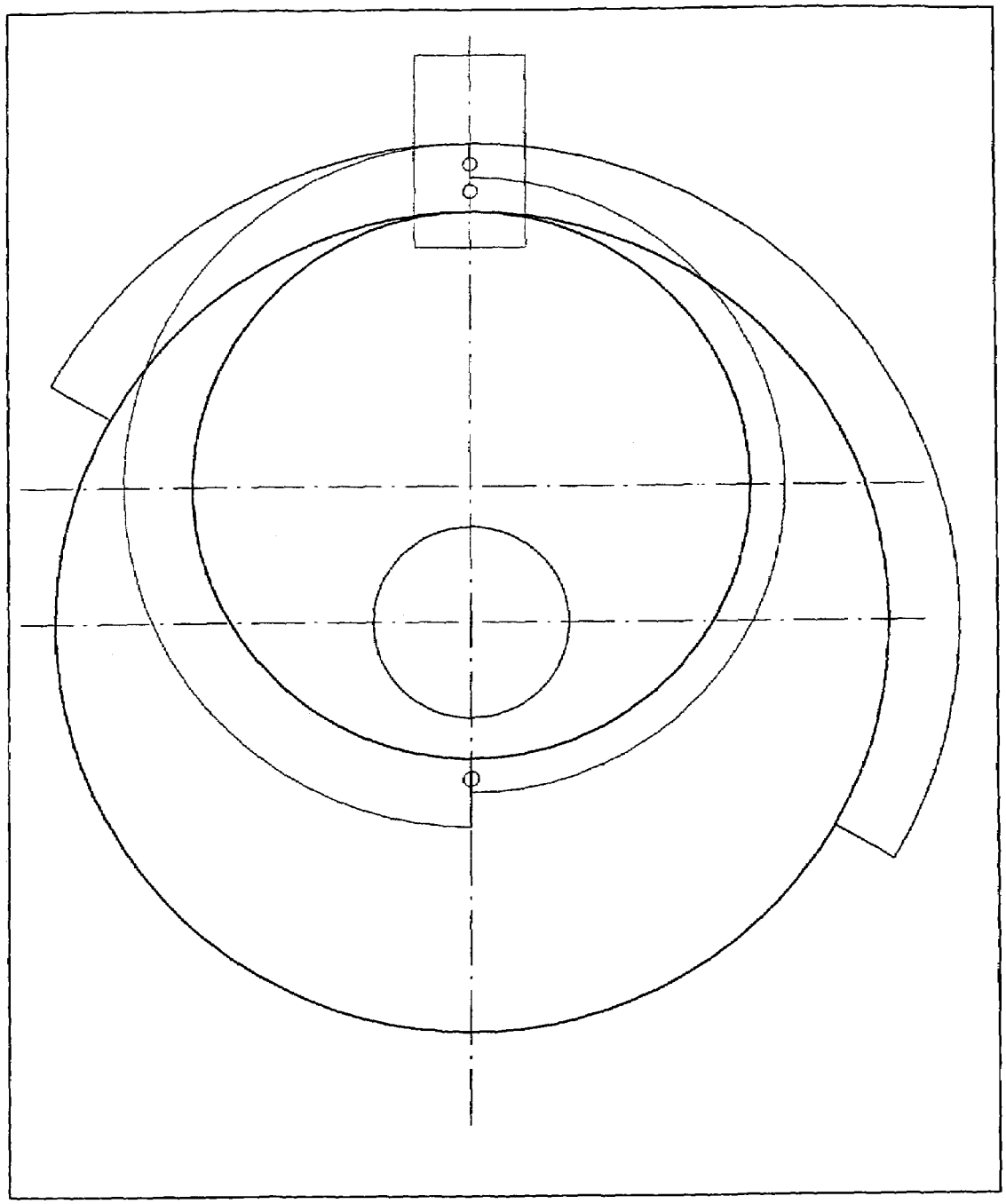
FIG. 16 illustrates a third angular position.
Figure 17:
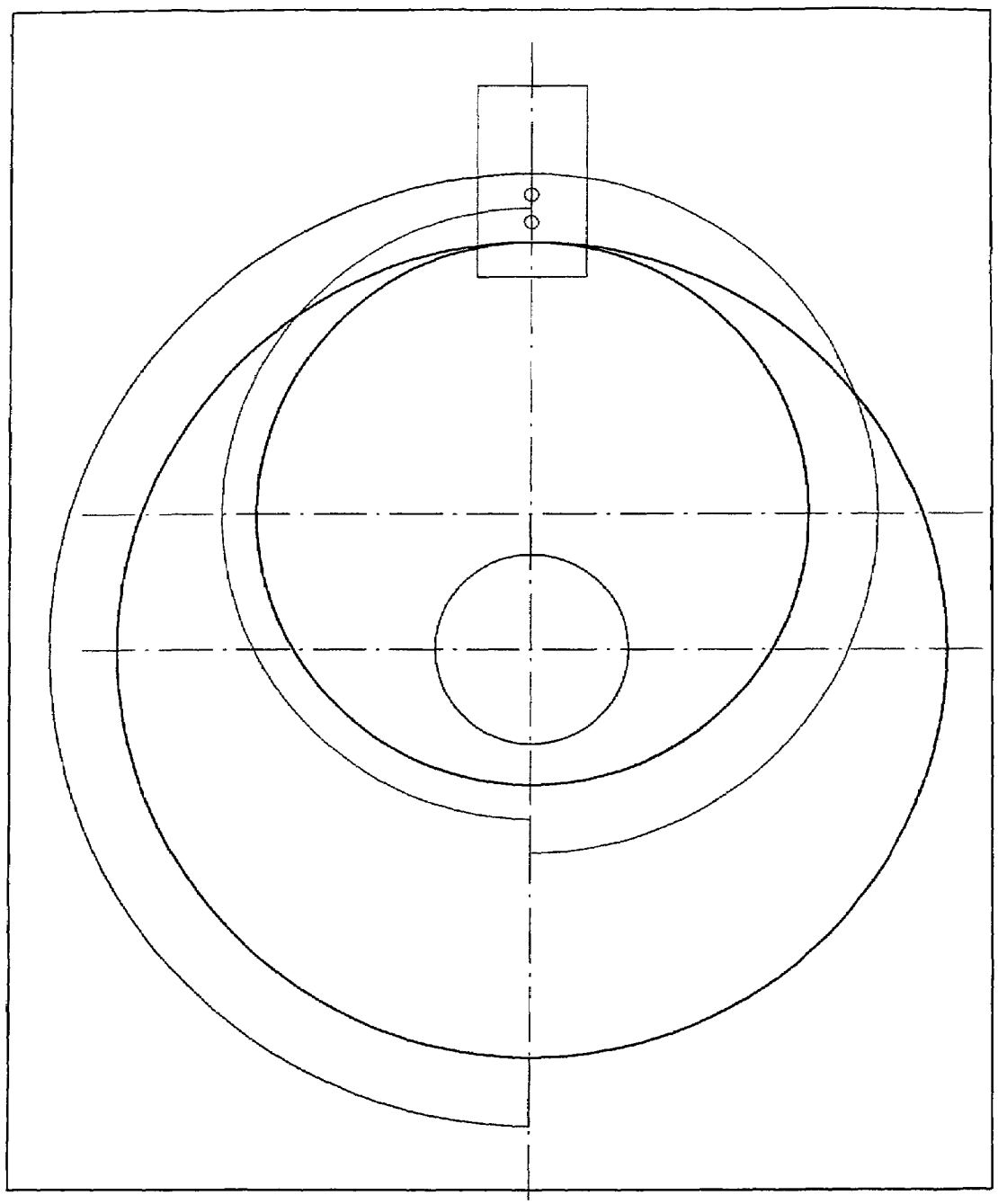
FIG. 17 illustrates a fourth angular position.

FIGS. 11 to 13 show an alternative form of embodiment of the invention. In the same way, a worm shaft 10 with worm 12 is provided here, which engages with a gear wheel 14. Gear wheel 14 is mounted on a hollow shaft 16, on which a reference disc 118 is in turn mounted. This reference disc, in the same way as in the variant of embodiment described previously, has an internal geared wheel 119, on which a rim is added in the form of a flange. With reference disc 118, however, as shown for example in FIGS. 11 to 13, the flange-like rim is widened here over half the periphery, whereby the transition to this widened rim portion 130 is formed by a point of discontinuity in the form of steps 132. A reference disc 120 of smaller diameter is assigned to reference disc 118. The former also has a shoulder 121, which is provided on the outside with toothing, so that this shoulder 121 forms a gear wheel which rotates in internal geared wheel 119. On shoulder 121 there is added again a flange-like rim, which, as with reference disc 118, is formed as a widened portion 134 in the area of half the periphery, said widened portion also stepping back discontinuously at its transition points in the form of a shoulder 136. A scanning device 22 is arranged at a point at which the respective flange-like rim areas of reference discs 118 and 120 largely overlap.

Several holes are arranged equally distributed on the periphery in smaller reference disc 120, whereas larger reference disc 118 contains one hole. The following geometric assignments of reference discs 118 and 120 apply to one another. If a number of revolutions N and a tooth number difference D between internal geared wheel 119 and gear wheel 121 are assumed, the number of teeth $Z_1=D\times N$ results for internal geared wheel 119. In contrast, the number of teeth of gear wheel 121 is $Z_2=Z_1-D$.

In the example of embodiment represented here, a number of revolutions N=3 is assumed. The tooth number difference D is 5. Internal geared wheel 119 has $Z_1$=15 teeth and gear wheel 121 $Z_2$=10. Taking account of a modulus m=2, a pitch circle diameter of 30 results for internal toothed wheel 119 and one of 20 for gear wheel 121. With the solution shown here, reference disc 118 is in the initial position again after three revolutions and reference disc 120 after four revolutions. In the present case, a complete revolution of reference disc 118 is detected by scanning device 22 by means of the inner—related to the reference discs—light barrier, whereas the outer light barrier of scanning device 22 detects different superimpositions of semicircular flange-like widened portions 130 and 134 and so for each revolution generates a typical bit pattern, which corresponds to a certain position of the closure element, i.e. the garage door.

According to the variant of embodiment represented here, the outer light barrier of scanning device 22 is operated in timing mode by a sensor 142 on the worm shaft 10. This optical sensor 142 detects, together with a slotted generator wheel 140, which is connected torsion-resistant to worm shaft 10, the rotational speed of the worm shaft, i.e. depending on the rotational speed of the worm shaft, a timing signal is generated with which the outer light barrier of scanning device 22 is operated in timing mode. By this means, the wear on worm 12 can be detected. Coupled with this, a suitable service signal can be transmitted in the event of a fairly large amount of wear on worm 12 or the motor can be forced to shut down, in order reliably to prevent malfunctioning of the gearing, i.e. the engagement of worm wheel 12 in gear wheel 14.

The invention claimed is:

1. A drive for closure elements, comprising
a reference value generator arranged in or on gearing (14, 12, 10) of the drive for determining the actual position of the closure element,
the reference value generator having two reference discs (18, 20) offset with respect to one another and thereby rotating at different angular speeds, which, in predetermined angular positions to one another, define the reference point positions which can be scanned by at least one scanning device (22),
said reference discs (18, 20) overlapping at least once during respective rotation,
each said reference disc (18, 20) comprising at least one signal mark (26, 28), and
said signal marks (26, 28) overlapping at least once during rotation of said respective reference discs (18, 20), such that said overlapping is detected by said scanning device (22).

2. The drive according to claim 1, additionally comprising gearing (19, 21) respectively arranged upon inner and outer circumferential portions of the reference discs (18, 20) which are connected together by the gearing (19, 21).

3. The drive according to claim 1, wherein the reference discs have different diameters.

4. The drive according to claim 3, wherein
a larger one (18) of the two reference discs (18, 20) comprises an internal toothed wheel (19),
a smaller one (20) of the two reference discs (18, 20) comprises a gear wheel ring (21) engaging internal toothed wheel (19) of the larger reference disc (18),
both reference discs (18, 20) largely overlap at least once during rotation, and
the at least one scanning device (22) is arranged in this overlapping area.

5. The drive according to claim 1, wherein signal marks in defined patterns are provided on the reference discs.

6. The drive according to claim 5, wherein the signal marks are constituted by holes, and the at least one scanning device comprises light detectors.

7. The drive according to claim 6, wherein the signal marks are constituted by hole patterns arranged parallel to one another in the radial or in the axial direction and arranged distributed on the periphery of the reference discs.

8. The drive according to claim 7, wherein the hole patterns on the smaller reference disc are arranged distributed on the periphery, while on the large reference disc parallel holes are arranged only in one place, which holes, in combination with the hole patterns of the smaller reference disc, generate different signals in the light detectors of the scanning device depending on the angular position of the two reference discs.

9. The drive according to claim 1, wherein both reference disks are widened over a part of their periphery, and the smaller reference disk has signal marks arranged distributed on the periphery, while the large reference disk has one signal mark.

10. The drive according to claim 9, wherein the signal marks are holes and at least one scanning device has two light detectors.

11. The drive according to claim 1, wherein the reference value generator is driven via a worm gear.

12. The drive according to claim 11, additionally comprising a sensor (142) for timing-mode operation of one of the light barriers of the scanning device (22) arranged on the worm shaft (10).

13. The drive according to claim 2, wherein the reference discs have different diameters.

14. The drive according to claim 2, wherein signal marks in defined patterns are provided on the reference discs.

15. The drive according to claim 3, wherein signal marks in defined patterns are provided on the reference discs.

16. The drive according to claim 4, wherein signal marks in defined patterns are provided on the reference discs.

17. The drive according to claim 2, wherein both reference disks are widened over a part of their periphery, and the smaller reference disk has signal marks arranged distributed on the periphery, while the large reference disk has one signal mark.

18. The drive according to claim 3, wherein both reference disks are widened over a part of their periphery, and the smaller reference disk has signal marks arranged distributed on the periphery, while the large reference disk has one signal mark.

19. The drive according to claim 9, wherein both reference disks are widened over half of their periphery.

20. The drive according to claim 7, wherein the scanning device (22) comprises four light detectors corresponding to the hole patterns when the holes on the respective reference discs are aligned.

21. The drive according to claim 20, having a single scanning device (22) arranged to detect all overlapping of said signal marks (26, 28).

22. The drive according to claim 7, having a single scanning device (22) arranged to detect all overlapping of said signal marks (26, 28).

23. The drive according to claim 6, having a single scanning device (22) arranged to detect all overlapping of said signal marks (26, 28).

24. The drive according to claim 1, having a single scanning device (22) arranged to detect all overlapping of said signal marks (26, 28).

* * * * *